(12) United States Patent
Friedl

(10) Patent No.: US 12,092,508 B2
(45) Date of Patent: Sep. 17, 2024

(54) JET DOSING VALVE

(71) Applicant: PERFECDOS GBR, Ergertshausen (DE)

(72) Inventor: Peter Friedl, Dietramszell (DE)

( * ) Notice: Subject to any disclaimer, the term of this patent is extended or adjusted under 35 U.S.C. 154(b) by 378 days.

(21) Appl. No.: 17/358,283

(22) Filed: Jun. 25, 2021

(65) Prior Publication Data

US 2021/0318155 A1 Oct. 14, 2021

Related U.S. Application Data

(63) Continuation of application No. PCT/EP2019/086921, filed on Dec. 23, 2019.

(30) Foreign Application Priority Data

Dec. 27, 2018 (DE) ...................... 10 2018 133 606.3

(51) Int. Cl.
*G01F 3/16* (2006.01)
*B05B 1/30* (2006.01)

(52) U.S. Cl.
CPC .............. *G01F 3/16* (2013.01); *B05B 1/3013* (2013.01)

(58) Field of Classification Search
CPC ......... G01F 3/16; B05B 1/3013; B05B 1/083; B05B 1/306; B05C 11/1028; B05C 5/0212; B05C 5/0237; B05C 11/1034; F16K 31/0627; F16K 31/0634; F16K 31/1221

See application file for complete search history.

(56) References Cited

U.S. PATENT DOCUMENTS

| 4,678,100 | A | 7/1987 | Gelinas et al. |
| 2012/0273071 | A1 | 11/2012 | Kai |
| 2014/0291358 | A1* | 10/2014 | Fliess .................... G01F 11/021 222/504 |

FOREIGN PATENT DOCUMENTS

| DE | 252 869 A1 | 12/1987 |
| DE | 10 2004 031 854 A1 | 1/2006 |
| DE | 10 2015 000 630 B3 | 2/2016 |
| EP | 1 155 748 A1 | 11/2001 |
| EP | 1 029 626 B1 | 6/2004 |
| EP | 2 143 503 A1 | 1/2010 |
| WO | 2013066687 A1 | 5/2013 |
| WO | 2013157940 A1 | 10/2013 |
| WO | 2015036096 A1 | 3/2015 |

OTHER PUBLICATIONS

International Search Report issued for corresponding International Patent Application No. PCT/EP2019/086921 mailed on Apr. 24, 2020.

* cited by examiner

*Primary Examiner* — Vishal Pancholi

(57) ABSTRACT

A dosing valve is provided for ejecting a liquid from a nozzle outlet channel. The dosing valve has a main body, a valve actuating element movable within the main body, and a valve closure element connected to or actuatable by the valve actuating element. The valve closure element is movable within a dosing chamber between an open position, in which it is lifted off from a nozzle sealing seat, and a closed position, in which it lies against the nozzle sealing seat. For the pneumatic activation of the dosing valve, a switching valve is provided by means of which a working chamber of the dosing valve can be selectively ventilated or charged with a pressurized fluid.

9 Claims, 6 Drawing Sheets

JET DOSING VALVE

CROSS REFERENCE TO RELATED APPLICATIONS

This application is a continuation under 35 U.S.C. § 120 of International Application PCT/EP2019/086921, filed Dec. 23, 2019, which claims priority to German Application No. 10 2018 133 606.3, filed Dec. 27, 2018, the contents of each of which are incorporated by reference herein.

FIELD OF THE INVENTION

The present invention relates to a dosing valve for ejection of a liquid from a nozzle-outlet channel of the dosing valve

BACKGROUND

The present disclosure relates to a dosing valve for ejection of a liquid from a nozzle-outlet channel of the dosing valve, especially for dosed and contactless application of a liquid onto a surface, wherein the dosing valve has a main body, a valve-actuating element that is movable inside the main body and a valve-closing element that is joined to the valve-actuating element or can be actuated thereby. This valve-closing element is movable inside a dosing chamber between an open position lifted from a nozzle-sealing seat and a closed position bearing on the nozzle-sealing seat, in order to achieve ejection of liquid from the nozzle-outlet channel of the dosing valve during the transition from its open position to the closed position. Furthermore, for pneumatic activation of the dosing valve, a switching valve is provided, with which a working space of the dosing valve may be optionally vented or pressurized with a pressurized fluid.

Such dosing valves, which are often also called "jet dosing valves" or "micro dosing valves", are sufficiently known from the prior art, for example from EP 1029626 B1, and are used for precise application of minute quantities (e.g. in the nanoliter or microliter range) of a liquid onto a surface, which has diverse application capabilities, especially in industrial fabrication processes.

In principle, the liquid to be applied by means of such a dosing valve may be any desired liquids, but in particular they may also be highly viscous liquids (such as adhesive, lubricant, etc.).

The dosing chamber of the dosing valve forms a liquid reservoir for the liquid to be ejected or is in fluidic communication with a separate, typically pressurizable liquid reservoir and has a nozzle-outlet channel, which is blocked when the valve-closing element is in closed position and is released when the valve-closing element is lifted from the nozzle-sealing seat. The actual dosing process takes place by ejection of a liquid drop at an open end of the nozzle-outlet channel, in that the valve-closing element lifted beforehand from its closed position into the open position is accelerated strongly in the direction of the nozzle-sealing seat, together with the liquid present between the valve-closing element and nozzle-outlet channel.

If the valve-closing element is now first transferred from its closed position to its open position during operation of the dosing valve, i.e. is lifted from the nozzle-sealing seat by a suitably predetermined stroke, a certain return flow of liquid—depending on speed of the lifting process and on viscosity of the liquid—then takes place from the nozzle-outlet channel into the dosing chamber. This suck-back effect decreases with increasing distance of the valve tappet from the nozzle-sealing seat. At the same time or subsequent to this, liquid is then able to flow back from the liquid reservoir or from the rest of the dosing chamber into the space underneath the valve tappet as well as into the nozzle-outlet channel, which is typically favored by the fact that the liquid present in the liquid reservoir is appropriately subjected to pressure.

Low-viscosity media such as water or alcohol penetrate relatively rapidly into the nozzle-outlet channel when the valve tappet is lifted and are already able to flow out of its end with short time delay. High-viscosity media such as adhesives based on epoxy or silicone fill the nozzle-outlet channel relatively slowly.

Thus too long opening times of the dosing valve should be avoided as much as possible during operation thereof, since a liquid already emerging at the open end of the nozzle-outlet channel changes the surface-tension conditions so much in the outlet area that deflection would occur during ejection of the liquid at the edge of the nozzle-outlet opening, thus adversely influencing the precision of the dosing and ejection process.

During closing of the dosing valve, the valve-closing element is accelerated in the direction of the nozzle-sealing seat, whereupon, in principle, the liquid present in the dosing chamber is both displaced inside the dosing chamber (or is able to flow in the direction of a separate liquid reservoir) and is also able to flow in the direction of the nozzle-outlet channel. However, the gap between the valve-closing element and the nozzle-sealing seat becomes increasingly narrow during the closing process and then successively hinders the return flow of the medium in the direction of the liquid reservoir, so that, in the final phase of the closing process, the fluid path through the nozzle-outlet channel represents the smallest flow resistance to the liquid, so that the accelerated medium is ultimately forced into the nozzle-outlet channel.

At the end of the closing process, i.e. when the valve-closing element occupies its closed position while bearing on the nozzle-sealing seat, the previously accelerated liquid column continues in the imposed movement direction. Since material from the liquid reservoir or from the part of the dosing chamber situated in tightly sealed condition above the nozzle-sealing seat is suddenly no longer able to flow back into the nozzle-outlet channel when the valve-closing element is in closed position, the liquid jet emerging from the dosing valve through the nozzle-outlet channel becomes laterally constricted and finally tears away. This is referred to as drop breakoff. This drop then continues to fly in movement direction until it impinges at the desired position on the surface onto which it was intended to be applied.

In this connection, it is to be noted that the surface tension of the liquid to be dosed may oppose the sequence described above, with the result that, if the outlet velocity is insufficient, for example, no drop is able to break off and the liquid retracts into the nozzle-outlet channel and remains there as undosed residue (especially in the region of the nozzle-outlet channel mouth). Subsequent drops are additionally hindered as a result.

This circumstance, and the fact that increasing viscosity of the liquid to be dosed is also accompanied by increased resistance to flow through the nozzle-outlet channel, therefore usually requires that the closing movement of the valve-closing element be as rapid and forceful as possible. For the frequently desired dosing of the most minute quantities in the nanoliter range, it is additionally required that the nozzle-outlet channel be of particularly small dimensions, thus further amplifying the requirements for a closing process that is as rapid as possible.

SUMMARY

Within the scope of the present disclosure, the movement of the valve-closing element between its open position and its closed position, as required for operation of the dosing valve, is controlled pneumatically with the aid of a switching valve, with which a working space suitably disposed inside the main body of the dosing valve may optionally be vented or pressurized with a compressed fluid. This valve-closing element (actuated by the valve-actuating element or if necessary constructed in one piece therewith) of the dosing valve may be preloaded conventionally by means of a spring either in open position or in closed position, so that the valve-closing element—depending on the direction of spring preloading and the direction of the force exerted on the valve-closing element when the working space is pressurized—may be moved between closed position and open position by pressurization or venting of the working space.

Typically the valve-closing element of a generic and inventive dosing valve is joined securely to the valve-actuating element or is constructed in one piece therewith, although variants of jet dosing valves are also known in which a separate valve-actuating element actuates the valve-closing element. These valve-actuating elements and valve-closing elements are constructed as individual structural parts and are spaced apart from one another in a functional position. For acceleration of the valve-actuating element from its functional position to its closed position, the valve-actuating element alone is then first accelerated in the direction of the valve-closing element and made to collide therewith, in order to accelerate the valve-closing element suddenly in the direction of its closed position by momentum transfer induced during the collision (see EP 2143503 A1).

In the prior art, 3/2-way valves in the form of solenoid valves are used in the vast majority of cases as switching valves for pneumatically activated jet dosing valves, in view of the functionality needed for this purpose. These are characterized by three ports (compressed-fluid port, venting port and working port for establishing the communication with the working space of the dosing valve) and two different switched positions (for optional pressurization and venting of the working port in communication with the working space).

The maximum possible closing speeds of electropneumatically operated valves are limited by narrow cross sections in the switching or solenoid valve. Solenoid valves with particularly large cross sections have longer switching times imposed by their design principle and therefore are not suitable for dosing minute quantities, especially when highly viscous liquids are to be output in dosed manner. Due to ever-tightening requirements of industry, electropneumatically operated jet dosing valves are therefore reaching their limits increasingly more often.

Complex dosing valves with piezo drive are indeed suitable for the technical requirements, but the principle-related small working stroke of such switching values, usually amounting to 50-200 µm, complicates all processes involved in manufacture and operation of the system and thus leads to high overall process costs.

Furthermore, in the prior art according to EP 2813293 A1, it has already been proposed that several switching valves (respectively constructed as solenoid valves) connected in parallel may also be used for pneumatic activation of a generic dosing valve, in order to increase the mass flow of compressed fluid available for the switching processes by connecting several valves in parallel and/or to achieve improved adjustability of the valve dynamic by variable timing of the individual solenoid valves. However, this solution suffers from the disadvantage of requiring a relatively large installation space. In addition, the use of several switching valves proves to be complex from the equipment viewpoint, because it requires in particular that a large number of individual valves be controlled in synchronized manner.

Furthermore, it is already known from publications DE 102004031854 A1, DE 102015000630 B3, WO 2013/066687 A1, WO 2013/157940 A1, WO 2015/036096 A1 and DD 252869 A1 that generic dosing valves may also be operated as switching valves in various forms of interconnections with the aid of a 5/2-way valve. However, the interconnection of the 5/2-way valve specified respectively therein differs significantly from the present invention.

Against this background, it is an object of the present invention to provide a dosing valve of the type explained in the foregoing, having the simplest possible configuration, which valve occupies the smallest possible installation space and has a switching characteristic that is particularly suitable for contactless jet dosing of minute quantities of a highly viscous liquid.

This object is achieved with a dosing valve, which valve, besides the features already mentioned in the introduction, is characterized in that the switching valve is configured as a directional valve with two switched positions and at least five ports and is interconnected in such a way that, in a first switched position of the switching valve, the working space of the dosing valve is simultaneously in communication either with at least two vented ports of the switching valve or with at least two ports thereof pressurized with pressurized fluid, whereas, in a second switched position of the switching valve, the working space of the dosing valve is in communication either with a port of the switching valve pressurized with pressurized fluid or with a vented port thereof.

In the inventive dosing valve, it is therefore provided that the working space of the dosing valve, in a first switched position of the switching valve that is used in particularly expedient manner for closing of the dosing valve, is simultaneously in fluidic communication with at least two pressurized ports or with at least two vented ports of the switching valve. wherewith a particularly rapid and forceful closing process can be achieved, which is of advantage in particular for jet dosing of highly viscous liquids.

Furthermore, it is provided that the working space, in the second switched position of the switching valve that is typically used for opening of the dosing valve, is in communication with (precisely) one pressurized or vented port of the switching valve, wherewith a gently occurring (compared with the closing process) opening process can be achieved. This in turn proves to be advantageous in particular for dosed output of highly viscous liquid such as adhesives, since the relatively gentle opening process ensures that suction of air bubbles through the nozzle-outlet channel into the liquid during the opening process can be effectively avoided.

Within the scope of the present disclosure, therefore, it is possible in simple manner to achieve a switching characteristic that is particularly suitable for dosed application of highly viscous liquids onto surfaces, wherein the inventive valve configuration has still further advantages, which will be explained in still more detail hereinafter on the basis of the exemplary embodiments shown in the figures.

Since the switching valve used must provide only two switched positions, this may be achieved with a single switched-valve actuating element, which keeps the complexity of the equipment and switching technology low.

In particularly favorable manner, the switching valve used is a 5/2-way valve, which has precisely five ports and two switched positions. Incidentally, such 5/2-way valves are commercially available in particularly compact designs and have suitable valve dynamics.

Furthermore, it is preferably provided within the scope of the present disclosure that the valve-actuating element of the dosing valve is a piston that can be displaced linearly inside the main body and that the valve-closing element is a valve tappet, wherewith a mechanically simple design can be realized for the dosing valve.

Moreover, it is preferably provided that the dosing chamber of the inventive dosing valve is in communication via a liquid supply channel with a liquid reservoir (advantageously pressurized).

Within the scope of a first particularly expedient design variant of an inventive valve, in which a 5/2-way valve is used as the switching valve, it may be further provided that the valve-closing element (or the valve tappet) is preloaded in its open position by means of a spring acting on the valve-closing element (or on the valve tappet) or on the valve-actuating element (or on the piston) and that, of the five ports in total of the switching valve, a first and second port of the switching valve are in communication with one another and are jointly connected to a compressed fluid supply, a third and fourth port of the switching valve are in communication with the working space of the dosing valve and a fifth port of the switching valve is connected to a vent.

Within the scope of a second design variant—which in contrast to the foregoing is an alternative and is likewise particularly expedient—of an inventive valve, in which a 5/2-way valve is used as the switching valve, it may be provided that the valve-closing element (or the valve tappet) is preloaded in its closed position by means of a spring acting on the valve-closing element (or on the valve tappet) or on the valve-actuating element (or on the piston) and that, of the five ports in total of the switching valve, a first and second port of the switching valve are in communication with one another and are jointly connected to a vent, a third and fourth port of the switching valve are in communication with the working space of the dosing valve and a fifth port of the switching valve is connected to a pressurized fluid supply.

Within the scope of the present disclosure, it also proves particularly advantageous when at least one positioning element is provided with which the cross section of a connecting channel used for pressurization and/or venting of the working space can be changed, especially reduced. Hereby the switching characteristic of an inventive valve can be adapted in particularly simple manner to the material properties of different liquids (to be dosed), as will be explained in even more detail hereinafter in connection with the description of the figures.

Furthermore, it is of advantage when, between switching valve and dosing valve, an adapter piece is provided in which connecting channels are formed that act as fluidic communication between two ports of the switching valve and the working space of the dosing valve.

In addition, it may be then further provided that the at least one positioning element is disposed in or on the adapter piece.

BRIEF DESCRIPTION OF THE DRAWING

Various exemplary embodiments of the invention will be explained in more detail hereinafter on the basis of the drawing, wherein.

DETAILED DESCRIPTION OF THE PREFERRED EMBODIMENTS

Figure 1A:
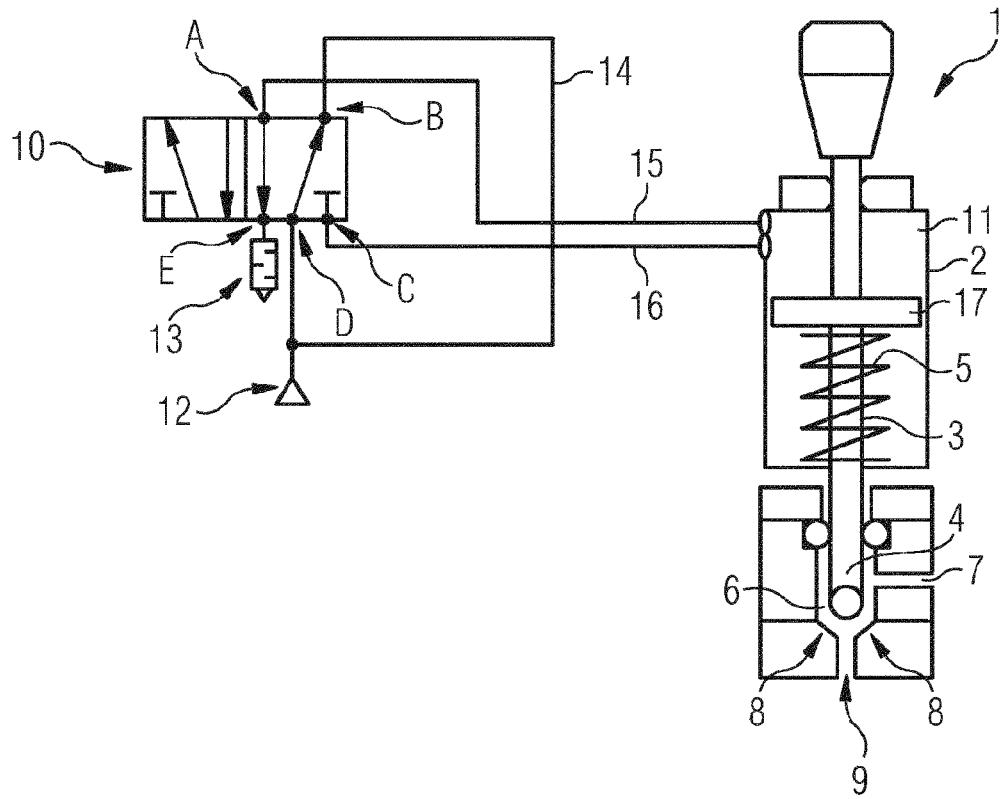
FIG. 1a shows a schematic diagram of a first exemplary embodiment of an inventive dosing valve, in which the switching valve is situated in a first switched position.
Figure 1B:
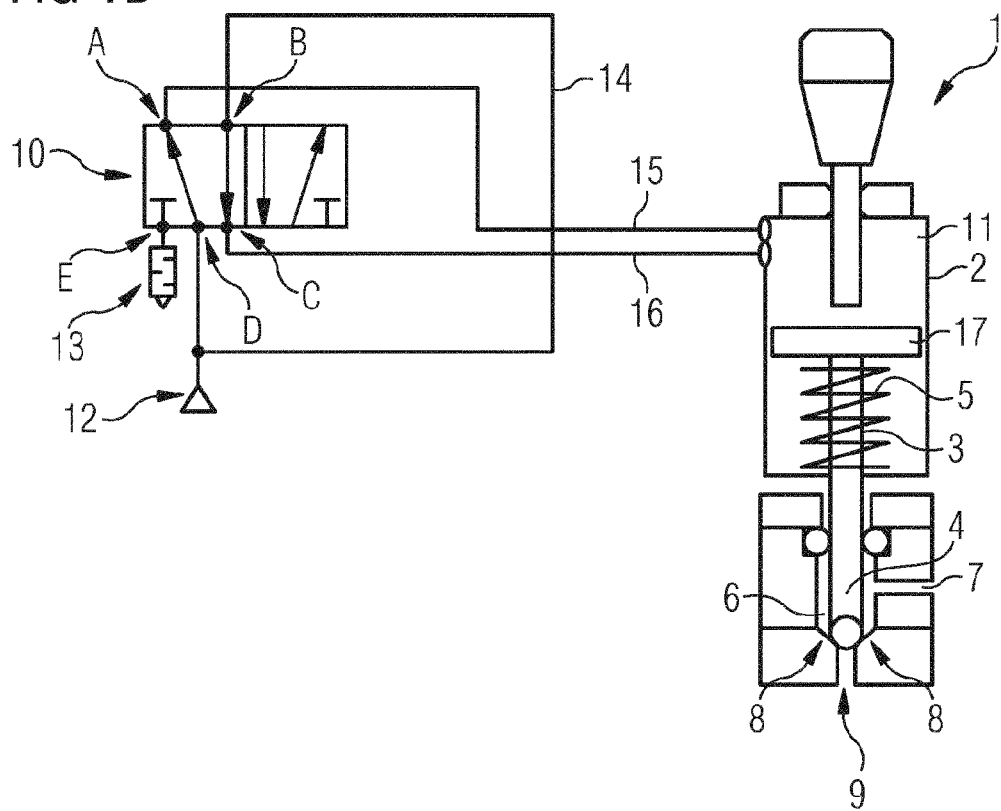
FIG. 1b shows the dosing valve from FIG. 1a, in which the switching valve is situated in a second switched position.

The first exemplary embodiment of an inventive dosing valve 1 as illustrated—partly schematically—in FIGS. 1a and 1b comprises a main body 2, a piston 3 (=valve-actuating element) that can be linearly displaced inside main body 2 and a valve tapper 4 (=valve-closing element) formed by a lower end of piston 3 in the manner of a nozzle needle, wherein piston 3 (and with it valve tappet 4) is preloaded by a spring 5 braced against main body 2 into the position illustrated here in FIG. 1a, in which dosing valve 1 is open.

Dosing valve 1 further comprises a dosing chamber 6, which is in communication via a liquid-supply channel 7 disposed laterally beside it with a liquid reservoir (not illustrated), in which the liquid to be applied onto a surface by means of dosing valve 1 is maintained under pressure, wherein the liquid may be in particular a highly viscous liquid, such as adhesive.

This valve tappet 4 is movable inside dosing chamber 6 between an open position lifted from a nozzle-sealing seat 8 (see FIG. 1a) and a closed position bearing on the nozzle-sealing seat 8 (see FIG. 1b), in order to achieve ejection of liquid from a nozzle-outlet channel of the dosing valve during the transition from its open position to the closed position.

Furthermore, for pneumatic activation of dosing valve 1, a switching valve 10 constructed as a solenoid valve and configured as a 5/2-way valve is provided, with which a working space 11 of dosing valve 1 may be optionally vented or pressurized with a pressurized fluid.

In the first exemplary embodiment illustrated in FIGS. 1a and 1b, in which valve tappet 4 of dosing valve 1 is preloaded in its open position by means of spring 5, of the five ports A, B, C, D, E in total of switching valve 10, a first and second port B, D of switching valve 10 are in communication with one another via a connecting channel 14 and are jointly connected to a pressurized-fluid supply 12. A third and fourth port A, C of switching valve 10 are in communication via connecting channels 15, 16 with working space 11 of dosing valve 1, while a fifth port E of the switching valve is connected to a vent 13.

In the switched position of switching valve 10 illustrated in FIG. 1a, working space 11 of dosing valve 1 is in communication via a single connecting channel 15 with vented port A of switching valve 10, whereas the second connecting channel 16 leading to working space 11 is connected to a port C, which in the given switched position of switching valve 10 is blocked (i.e. neither pressurized nor vented). This switched position therefore serves the "single-acting" venting of working space 11, which here is situated above a piston plate 17, so that valve tappet 4 of dosing valve 1 is transferred by means of spring 5 into the open position.

In the switched position of switching valve 10 illustrated in FIG. 1b, working space 11 of dosing valve 1 is simultaneously in communication via two connecting channels 15, 16 with the respective pressurized ports A and C of switching valve 10. This switched position therefore serves as the "double-acting" pressurization of working space 11, which is situated above piston plate 17, so that valve tappet 4 of dosing valve 1 is transferred forcefully against the force of spring 5 into its closed position, whereby—as described in the introduction—a drop of the liquid present in dosing chamber 6 and the liquid reservoir in communication therewith is ejected through nozzle-outlet channel 9.

Figure 2:
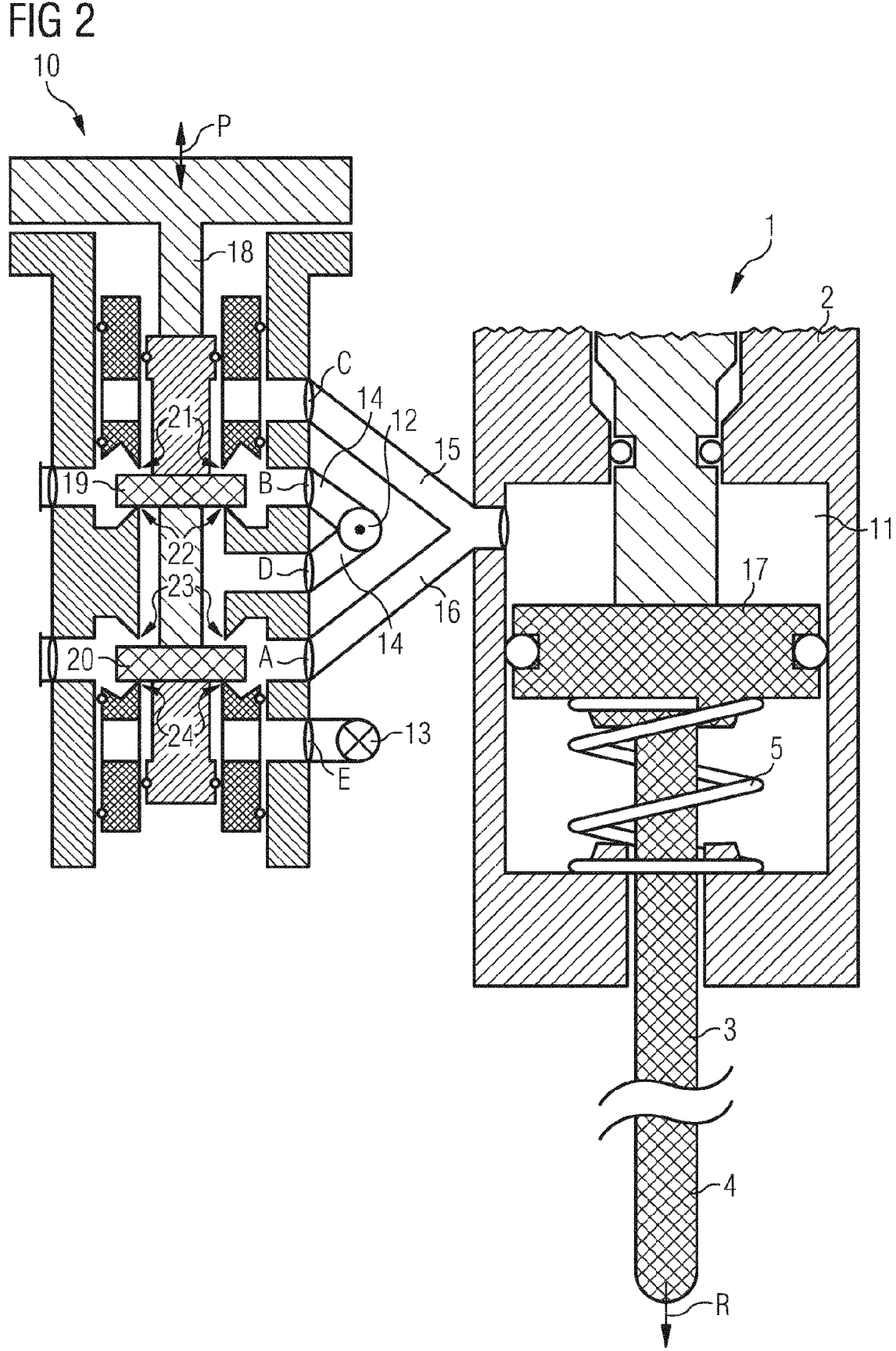
FIG. 2 shows a further (partial) diagram of the first exemplary embodiment of the invention for illustration of further details.

FIG. 2 shows a more detailed (partial) cross-sectional diagram through part of dosing valve 1 and through part of switching valve 10 of the first exemplary embodiment of the invention.

The 5/2-way valve used as this switching valve 10 is configured as a high-dynamic solenoid valve with a magnetically actuatable valve piston 18 that can be linearly displaced according to double arrow P, wherein, for the sake of better clarity, the spool provided for deflection of valve piston 18 is not illustrated.

The switched position of switching valve 10 illustrated in FIG. 2 corresponds to that from FIG. 1b, in which the two connecting channels 15, 16 leading to working space 11 are pressurized simultaneously (i.e. are in fluid communication with pressurized-fluid supply 12).

Switching valve 10 has, joined to valve piston 18, two valve bodies 19, 20, which can be displaced between two sealing edges 21, 22 and 23, 24 (limiting the positionability of the valve upward and downward) during positioning of valve piston 18 according to double arrow P.

In the shown switched position, in which the two valve bodies 19, 20 bear respectively on the sealing edges 22 and 24 situated below the respective valve body 19, 20, pressurized-fluid supply 12, connected simultaneously via connecting channel 14 to two ports B, D of switching valve 10, is in fluidic communication with the two further ports A, C of the switching valve that in turn are in communication via two connecting channels 15, 16 with working space 11 of dosing valve 1. The pressure building up in working space 11 of dosing valve 1 at this time then accelerates piston 3 together with valve tappet 4 formed on its end in the direction of arrow R until valve tappet 4 comes to bear on nozzle-sealing seat 8, not illustrated in FIG. 2, while causing ejection of a liquid drop.

If valve piston 18 of switching valve 10 is now moved electromagnetically upward from the switched position illustrated in FIG. 2 until the two valve bodies 19, 20 of switching valve 10 bear respectively on sealing edge 21 and 23 situated above the respective valve body 19, 20, then uppermost port C of switching valve 10 in FIG. 2 is blocked (i.e. neither pressurized nor vented) and working space 11 of the dosing valve is vented exclusively via a single connecting channel 16 in communication with vent 13.

If necessary, connecting channels 14, 15, 16 illustrated in FIGS. 1a, 1b and 2 may also be dimensioned differently (especially in terms of their respective channel cross section), in order to optimize the switching characteristic of the dosing valve, for example for the material properties of a particular liquid. Furthermore, appropriately adjustable positioning elements may also be provided if necessary in the region of individual connecting channels or portions of connecting channels, in order to be able to adapt the pressurization or venting process and thus the closing or opening speed of the dosing valve selectively to different liquids and their material properties.

Figure 3A:
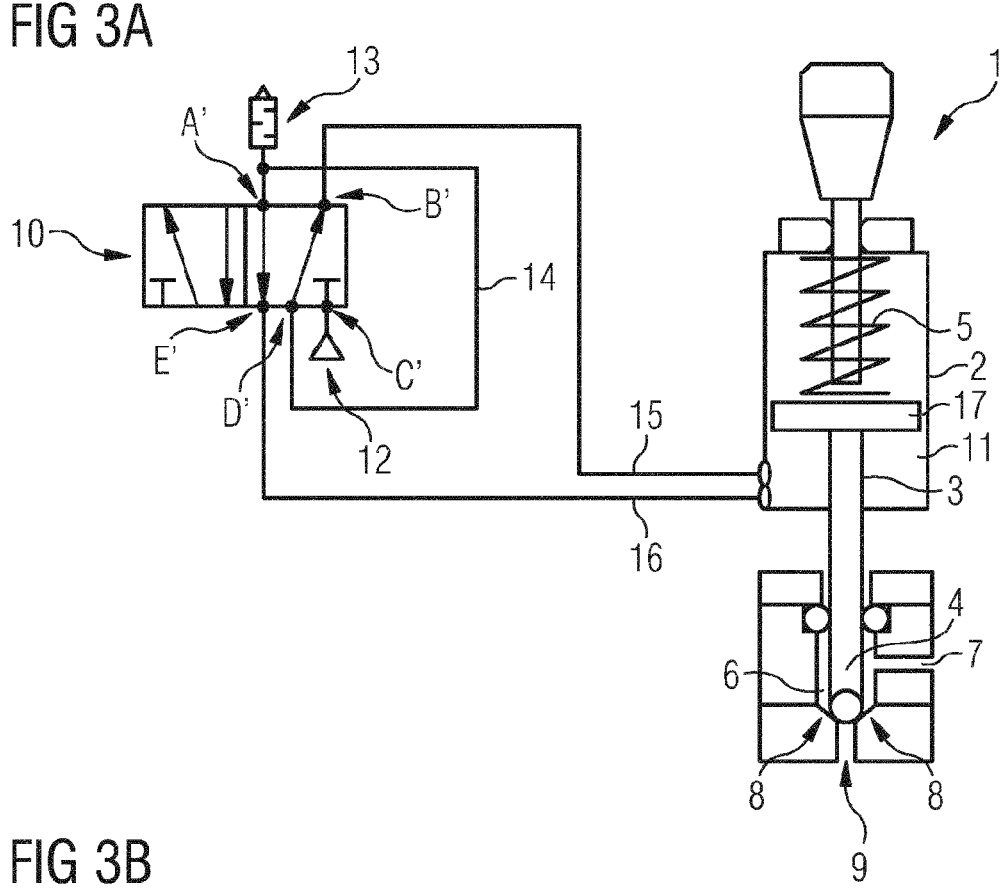
FIG. 3a shows a schematic diagram of a second exemplary embodiment of an inventive dosing valve, in which the switching valve is situated in a first switched position.
Figure 3B:
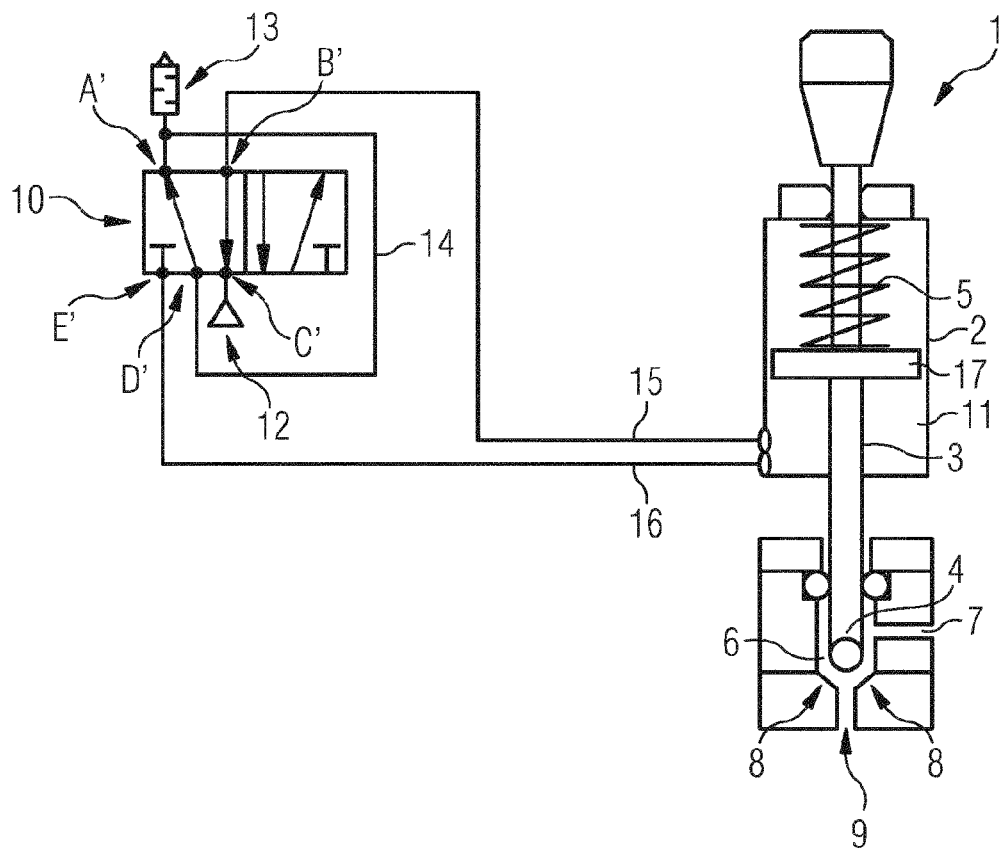
FIG. 3b shows the dosing valve from FIG. 3a, in which the switching valve is situated in a second switched position.
Figure 4:
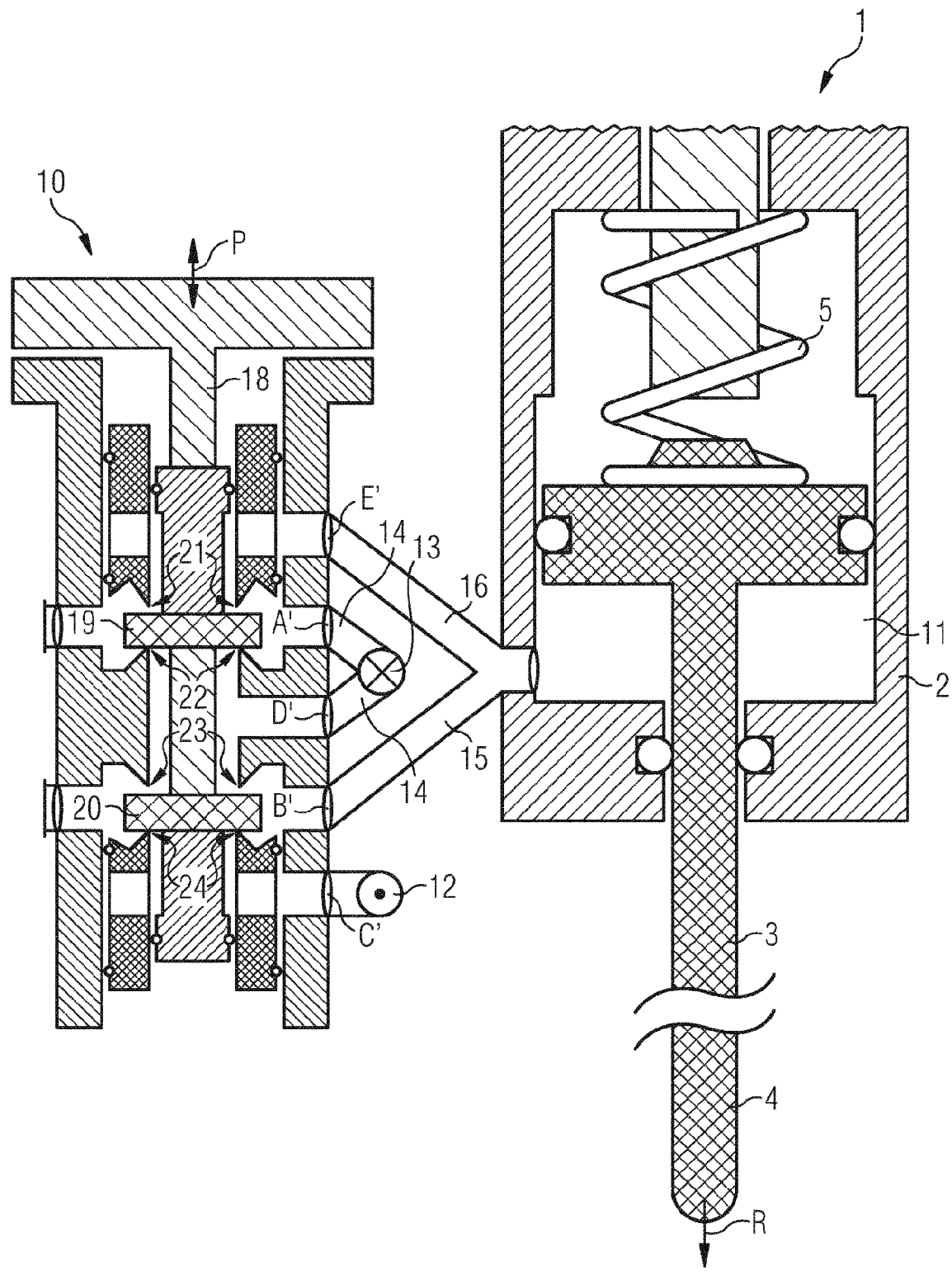
FIG. 4 shows a further (partial) diagram of the second exemplary embodiment of the invention for illustration of further details.

FIGS. 3a, 3b and 4 show a second exemplary embodiment of an inventive dosing valve 1, in which structural parts corresponding to the structural parts used in the first exemplary embodiment are denoted with the same reference symbols.

In contrast to the first exemplary embodiment, however, valve tappet 4 of dosing valve 1 illustrated in FIGS. 3a, 3b and 4 is now preloaded in its closed position by means of a spring 5 exerting force on piston 3 from above. Furthermore, working space 11 of dosing valve 1 now no longer lies above but instead lies below piston plate 17. Moreover, of the five ports A', B', C', D', E' in total of switching valve 1, a first and second port A', D' of switching valve 10 are now in communication with one another via a connecting channel 14 and are connected jointly to a vent 13. A third and fourth port B', E' of switching valve 10 are in communication via connecting channels 15, 16 with working space 11 of dosing valve 1, while a firth port E' of switching valve 10 is connected to a pressurized fluid supply 12.

In the switched position of switching valve 10 illustrated in FIG. 3a, working space 11 of dosing valve 1 is simultaneously in communication via two connecting channels 15, 16 with the respective vented ports B' and E' of switching valve 10. This switched position therefore serves the "double-acting" venting of working space 11, which is situated below piston plate 17, so that valve tappet 4 of dosing valve 1—if it had been situated beforehand in its open position—can be transferred forcefully by the force of spring 5 into its closed position.

In the switched position of switching valve 10 illustrated in FIG. 3b, working space 11 of dosing valve 1 is in communication via a single connecting channel 15 with the then pressurized port B' of switching valve 10, whereas the second connecting channel 16 leading to working space 11 is connected to a port E', which in the given switched position of switching valve 10 is blocked (i.e. neither pressurized nor vented). This switched position therefore serves the "single-acting" pressurization of working space 11, which here is situated below a piston plate 17, so that valve tappet 4 of dosing valve 1 is transferred against the force of spring 5 into the open position shown in FIG. 3b.

FIG. 4 in turn shows a more detailed (partial) cross-sectional diagram through part of dosing valve 1 and through part of switching valve 10 of the second exemplary embodiment of the invention.

The 5/2-way valve used as this switching valve 10 is in turn configured as a high-dynamic solenoid valve with a magnetically actuatable valve piston 18 that can be linearly displaced according to double arrow P, wherein, for the sake of better clarity, the spool provided for deflection of valve piston 18 is not illustrated.

The switched position of switching valve 10 illustrated in FIG. 4 corresponds to that from FIG. 3a, in which the two connecting channels 15, 16 leading to working space 11 are both vented simultaneously (i.e. are in fluid communication with vent 13).

Here also, switching valve 10 has, joined to valve piston 18, two valve bodies 19, 20, which can be displaced between two sealing edges 21, 22 and 23, 24 (limiting the position-ability of the valve upward and downward) during positioning of valve piston 18 according to double arrow P.

In the shown switched position, in which the two valve bodies 19, 20 bear respectively on the sealing edges 22 and 24 situated below the respective valve body 19, 20, vent 13, connected simultaneously via connecting channel 14 to two ports A', D' of switching valve 10, is in fluidic communication with the two further ports E', B' of the switching valve that in turn are in communication via two connecting channels 15, 16 with working space 11 of dosing valve 1. The venting of working space 11 of dosing valve 1 taking place at this time ensures—if the dosing valve was situated beforehand in its open position—that piston 3 together with valve tappet 4 formed on its end is accelerated in the direction of arrow R and, in fact, until valve tappet 4 comes to bear on nozzle-sealing seat 8, not illustrated in FIG. 4, while causing ejection of a liquid drop.

If valve piston 18 of switching valve 10 is now moved electromagnetically upward from the switched position illustrated in FIG. 4 until the two valve bodies 19, 20 of switching valve 10 bear respectively on sealing edge 21 and 23 situated above the respective valve body 19, 20, then uppermost port E' of switching valve 10 in FIG. 4 is again blocked (i.e. neither pressurized nor vented) and working space 11 of the dosing valve is pressurized exclusively via connecting channel 15, which is then in communication with pressurized-fluid supply 12, whereby dosing valve 1 is transferred against the force of spring 5 into its open position.

Figure 5:
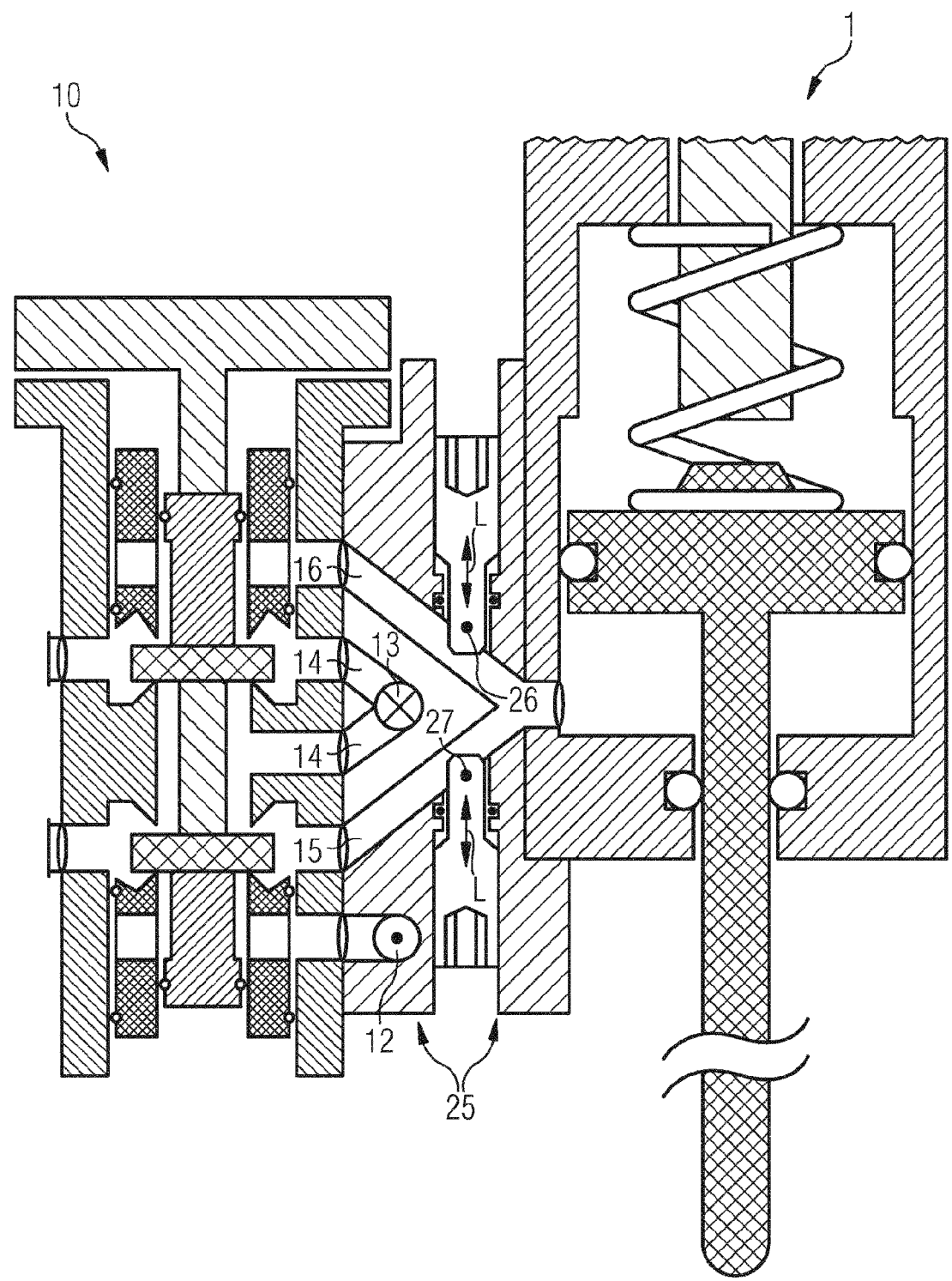
FIG. 5 shows a partial diagram of a third exemplary embodiment of the invention and FIG. 6 shows a qualitative diagram of the switching characteristic of an inventive dosing valve in comparison with solutions known from the prior art.

FIG. 5 shows—again in a partial diagram—a third exemplary embodiment of an inventive dosing valve 1 with associated switching valve 10, which in terms of configuration of dosing valve 1 and of switching valve 10 corresponds exactly to the second exemplary embodiment according to FIG. 4. As a new feature compared to that, however, it is added in the third exemplary embodiment that all connecting channels 14, 15, 16 there as well as ports for pressurized-fluid or compressed-air supply 12 and vent 13 are provided in an adapter piece 25 disposed between switching valve 10 and dosing valve 1, in which two more positioning elements 26, 27 (which respectively can be linearly displaced according to double arrow L) are additionally provided, with which the cross section of connecting channels 15 and 16 can be individually changed, whereby an influence may be exerted on the valve dynamic in order to adapt it, for example, to different material properties of various liquids.

For example, it may prove particularly advantageous for jet dosing of (UV) adhesives to reduce, by means of the lower positioning element in FIG. 5, the cross section of connecting channel 15 serving in the given example for pressurization of working space 11, in order to achieve a particularly gentle or throttled opening stroke for the dosing valve. This reduces the danger of inadvertent "pulling in" of air bubbles enclosed in the adhesive during opening of the dosing valve.

Furthermore, in the exemplary embodiment of the invention illustrated in FIG. 5, it would also be possible to provide corresponding positioning elements in connecting channel 14 forming the communication between vent 13 and two ports of switching valve 10. By means of cross-sectional reduction taking place there, the closing movement of dosing valve 1 may be throttled or slowed, if dosing valve 1 is to be used, for example, for application of medium-viscosity or low-viscosity liquids.

Merely for the sake of orderliness it is to be mentioned that corresponding positioning elements for exerting an influence on the cross-sectional area of connecting channels may obviously be provided even in the exemplary embodiments according to FIGS. 1a, 1b, 2 and to FIGS. 3a, 3b, 4, since the inventive dosing-valve construction means that pressurization and venting channels independent of one another exist in all shown variants.

Incidentally, it is to be remarked that, by means of an adapter piece 25 and of the associated switching valve 10 configured as a 5/2-way valve, as are illustrated in FIG. 5 in an exemplary embodiment, even already existing jet dosing valves may be retrofitted to be pneumatically activated in the inventive sense.

Figure 6:
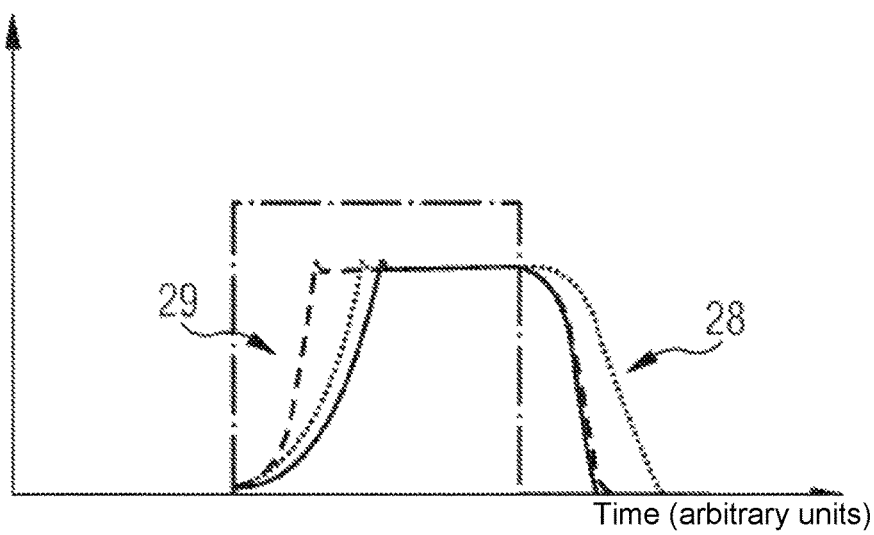

Finally, FIG. 6 also shows, in a qualitative diagram, the switching characteristic of an inventive dosing valve in comparison with dosing valves known from the prior art, in which either a 3/2-way valve or several solenoid valves connected in parallel is or are used.

The curves associated with the various valve types show the time profile of the piston stroke of the dosing valve, wherein the maximum stroke may vary depending on specific valve configuration and, for example, may be on the order of magnitude of approximately 500 μm.

In comparison with the previously known use of a 3/2-way valve, the profile of the piston stroke of an inventive dosing valve has a much more sharply descending closing edge 28 because of the interconnection—of the working space with two pressurized or vented ports of the switching valve—that takes place for the closing process. This corresponds to a particularly rapidly occurring closing process, as is also achievable with solenoid valves connected in parallel and as is needed in particular for jet dosing of minute quantities of highly viscous liquids.

At the same time, however, a relatively flat opening edge 29 is achievable with the present invention, because of the interconnection—of the working space with only one pressurized or vented port of the switching valve—that takes place for the opening process. This in turn (with effective prevention of suction of air through the nozzle-outlet channel) proves to be advantageous for jet dosing of highly viscous liquids, as already explained in the foregoing The electrical (square-wave) signal also shown additionally in FIG. 6 characterizes the electrical control signal output for activation of the switching valve (with an amplitude of 24 V, for example, and an ON time of 2 to 3 ms, for example, adapted to the valve dynamic).

What is claimed is:

1. A dosing valve (1) for ejection of a liquid from a nozzle-outlet channel (9) of the dosing valve (1) for dosed and contactless application of a liquid onto a surface,
wherein the dosing valve (1) has a main body (2), a valve-actuating element that is movable inside the main body (2) and a valve-closing element that is joined to the valve-actuating element or can be actuated thereby, wherein the valve-closing element can be moved inside a dosing chamber (6) between an open position lifted from a nozzle-sealing seat (8) and a closed position bearing on the nozzle-sealing seat (8), in order to achieve ejection of liquid from the nozzle-outlet channel (9) of the dosing valve (1) during the transition from its open position to the closed position, and wherein, for pneumatic activation of the dosing valve (1), a switching valve (10) is provided, with which a working space (11) of the dosing valve (1) may be selectively vented or pressurized with a pressurized fluid, wherein the switching valve (10) is configured as a directional valve with two switched positions and at least five ports (A, B, C, D, E; A', B', C', D', E') and is interconnected in such a way that, in a first switched position of the switching valve (10), the working space (11) of the dosing valve (1) is simultaneously in communication either with at least two vented ports of the switching valve (10) or with at least two ports thereof pressurized with pressurized fluid, whereas, in a second switched position of the switching valve (10), the working space (11) of the dosing valve (1) is in communication either with a port of the switching valve (10) pressurized with pressurized fluid or with a vented port thereof.

2. The dosing valve (1) of claim 1, wherein the switching valve (10) is a 5/2-way valve.

3. The dosing valve (1) of claim 1, wherein the valve-actuating element is a piston (3) that can be displaced linearly inside the main body (2) and in that the valve-closing element is a valve tappet (4).

4. The dosing valve (1) of claim 1, wherein the dosing chamber (6) is in communication via a liquid-supply channel (7) with a liquid reservoir.

5. The dosing valve (1) of claim 2, wherein the valve-closing element is preloaded in its open position by means of a spring (5) acting on the valve-closing element or on the valve-actuating element, and in that, of the five ports (A, B, C, D, E) in total of the switching valve (10), a first and second port (B, D) of the switching valve (10) are in communication with one another and are jointly connected to a pressurized-fluid supply (12), a third and fourth port (A, C) of the switching valve (10) are in communication with the working space (11) of the dosing valve (1) and a fifth port (E) of the switching valve (10) is connected to a vent (13).

6. The dosing valve (1) of claim 2, wherein the valve-closing element is preloaded in its closed position by means of a spring (5) acting on the valve-closing element or on the valve-actuating element, and in that, of the five ports (A', B', C', D', E') in total of the switching valve (10), a first and second port (A', D') of the switching valve (10) are in communication with one another and are jointly connected to a vent (13), a third and fourth port (B', E') of the switching valve (10) are in communication with the working space (11) of the dosing valve (1) and a fifth port (C') of the switching valve is connected to a pressurized-fluid supply (12).

7. The dosing valve (1) of claim 1, wherein at least one positioning element (26, 27) is provided, with which the cross section of a connecting channel (14, 15, 16) used for pressurization and/or venting of the working space (11) can be changed, especially reduced.

8. The dosing valve (1) of claim 1, wherein between switching valve (10) and dosing valve (1), an adapter piece (25) is provided in which connecting channels (14, 15, 16) are formed that act as fluidic communication between two ports of the switching valve (10) and the working space (11) of the dosing valve (1).

9. The dosing valve (1) of claim 7, wherein the at least one positioning element (26, 27) is disposed in or on the adapter piece (25).

\* \* \* \* \*